3,531,444
VULCANIZATION ACCELERATOR
COMBINATION

Rudolf Adolf Behrens, Sparta, N.J., assignor to American Cyanamid Company, Stamford, Conn., a corporation of Maine
No Drawing. Continuation-in-part of application Ser. No. 634,461, Apr. 28, 1967. This application Oct. 25, 1967, Ser. No. 677,885
Int. Cl. C08f 27/06
U.S. Cl. 260—79.5                                              9 Claims

ABSTRACT OF THE DISCLOSURE

A vulcanizable composition comprising sulfur, zinc oxide, a sulfur vulcanizable hydrocarbon elastomer such as butyl rubber, and a vulcanization accelerator composition comprising a combination of a bis(morpholinothiocarbonyl)sulfide of the formula

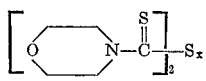

wherein $x$ is an integer of 1 through 6, and a thiuramsulfide or a metal dithiocarbamate.

---

This application is a continuation-in-part of application Ser. No. 634,461, filed Apr. 28, 1967, now abandoned.

This invention relates to the sulfur vulcanization of hydrocarbon elastomers. It relates further to the vulcanization of hydrocarbon elastomers, including diene-modified hydrocarbon elastomers, using a new organic accelerator composition comprising a combination of (a) a bis(morpholinothiocarbonyl)sulfide, represented by Formula I below:

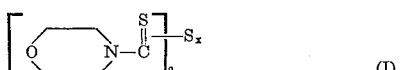
(I)

wherein $x$ is an integer of 1 through 6, and (b) a different thiuram sulfide and/or a metal dithiocarbamate.

Certain of the more recent hydrocarbon elastomers, notably ethylene-propylene rubber and butyl rubber, have been modified to contain low amounts of unsaturation so that they can be vulcanized using a sulfur vulcanization system. In the case of ethylene-propylene rubber, this modification is generally accomplished by the co-reaction of a non-conjugated diene such as dicyclopentadiene, 1,5-cyclooctadiene, norbornadiene, etc. Of particular importance in this respect is diene-modified ethylene-propylene rubber (EPDM). Butyl rubber intrinsically contains minor amounts of unsaturation resulting from isoprene units in the polymer structure. Neither of these elastomers was adaptable to the conventional vulcanization systems because of the low amounts of unsaturation which they contain as compared with other, more highly unsaturated general purpose elastomers such as styrene-butadiene copolymers (SBR) or natural rubber.

Sulfur vulcanization of EPDM and butyl rubber has been conventionally accomplished with the aid of zinc oxide and organic accelerators. The more effective primary accelerators are either thiuram mono-, di- or tetrasulfides, or metal dithiocarbamates. A thiazole, e.g., mercaptobenzothiazole, is normally necessary as a secondary accelerator to develop satisfactory cure rates.

Development of satisfactory vulcanization systems for EPDM has primarily been hindered by the tendency of the elastomer to undergo premature vulcanization (i.e., to scorch) and the tendency of the ingredients or their reaction products to migrate to the surface of the pre-vulcanizate and vulcanizate. A commonly used system for EPDM, which contains tetramethylthiuram disulfide, mercaptobenzothiazole and sulfur, provides satisfactory processing safety (scorch resistance) but mold-cured vulcanizates bloom badly. Attempts to correct this deficiency have led to reduced processing safety. For example, by replacing one-half of the tetramethylthiuram disulfide with dipentamethylene thiuram tetrasulfide and increasing the concentration of mercaptobenzothiazole, bloom is reduced and modulus level increases, but scorch resistance is greatly decreased. Other systems have been developed which tend less to bloom, but scorch resistance of the formulation is poor. Similar problems, including slow cure rate, are encountered with butyl rubber. Thus, there is a need for a sulfur vulcanization system for EPDM and butyl rubber which provides processing safety, a good cure rate, a good state of cure, and which is non-blooming. It is an object of this invention to provide such an improved vulcanization system. Other objects will become apparent from the ensuing description.

The present invention is based on the discovery that vulcanizable rubber with low amounts of unsaturation can be sulfur-vulcanized with safety at a good cure rate to provide satisfactory, non-blooming vulcanizates, if the vulcanization is conducted in the presence of an organic accelerator composition comprising a combination of a bis(morpholinothiocarbonyl)sulfide and a thiuram sulfide, or a metal dithiocarbamate.

Thiuram sulfides and metal dithiocarbamates have been known for many years and have been used extensively in vulcanization systems for many types of rubber. Bis(morpholinothiocarbonyl)sulfides, as described above, are not effective accelerators for EPDM or butyl rubber when used alone since they are very slow and give a low state of cure. It is thus surprising that the accelerator system of the present invention, obtained by the combination of a thiuram sulfide or a metal dithiocarbamate and a bis(morpholinothiocarbonyl)sulfide, is capable of giving a high state of cure without the sacrifice of processing safety. The system is unique in that no other bis (thiocarbonyl)sulfides have been found which accomplish the same or a similar result; for instance, bis(2,6-dimethyl morpholinothiocarbonyl)disulfide, a seemingly analogous compound, is relatively ineffective as will be seen in the examples to follow.

The diene-modified hydrocarbon elastomers which have been found to be effectively vulcanized with the novel accelerator system of the present invention are butyl rubber and the various ethylene-propylene rubbers containing minor amounts of unsaturation derived from copolymerization with dicyclopentadiene, 1,5-cyclooctadiene, norbornadiene, and the like. These are exemplified by Nordel, Royalene and Enjay hydrocarbon rubbers. Typical of commercially available butyl rubber is Enjay Butyl 218. The present invention is applicable to mixtures of these with other general purpose elastomers such as SBR, natural rubber and the like.

The first component of the novel accelerator system of the present invention is a bis(morpholinothiocarbonyl) sulfide, as represented by the above formula.

Among the thiuram mono- and polysulfides, and metal dithiocarbamates of use in the accelerator system of the present invention are included lower-alkyl, monocyclic ar(lower-alkyl), aryl and cyclic alkylene thiuram sulfides and dithiocarbamates such as:

Tetramethylthiuram disulfide
Tetramethylthiuram monosulfide
Tetraethylthiuram disulfide
Tetrabutylthiuram monosulfide
Dipentamethylenethiuram tetra- or hexasulfide
Dicyclohexamethylenethiuram disulfide Diisopropylthiuram disulfide
Phenylethylthiuram disulfide
Zinc dibutyl-dithiocarbamate
Zinc pentamethylene-dithiocarbamate
Bismuth dimethyldithiocarbamate
Nickel dibutyl-dithiocarbamate
Copper dimethyl-dithiocarbamate
Selenium diethyl-dithiocarbamate
Lead dimethyl-dithiocarbamate
Selenium dimethyl-dithiocarbamate
Tellurium dimethyl-dithiocarbamate
Tellurium diethyl-dithiocarbamate
Cadmium diethyl-dithiocarbamate
Zinc dibenzyl-dithiocarbamate
Zinc diethyl-dithiocarbamate The sulfur vulcanization system will always contain sulfur and zinc oxide; and often a secondary accelerator such as a thiazole. Preferably, the sulfur is present as elemental sulfur. However, in some cases the sulfur may be supplied by the thiuramsulfide, metal dithiocarbamate, or mixture of these two additives. The amount of elemental sulfur used will vary depending on the particular vulcanizate properties desired. Generally, increasing the concentration of sulfur will reduce the scorch resistance and increase the state of cure. The useful range of sulfur will generally be from about 0.5 to about 3.0 parts per 100 parts of rubber, although in some applications it could be as high as 5 or more parts. When the sulfur is supplied by the thiuramsulfide and/or metal dithiocarbamate, the amounts of these compounds may be adjusted to provide correspondingly effective amounts of sulfur.

Zinc oxide (or zinc soap, e.g., zinc stearate) is always used in the sulfur vulcanization system containing the accelerators of the present invention. The concentration of zinc oxide is not critical provided at least 1.0 part per 100 parts of rubber is used. Generally usage of about 3–5 parts of zinc oxide is found to be effective.

Mercaptobenzothiazole (MBT) is commonly used as a secondary accelerator in the vulcanization of EPDM and butyl rubber. Increasing the concentration of mercaptobenzothiazole causes a decrease in the scorch resistance. Generally effective amounts of MBT will be in the range of about 0.5 to about 4.0 parts per 100 parts of rubber. Benzothiazyl disulfide (MBTS) is another commonly used secondary accelerator which can be used in the same concentration.

The vulcanizable compositions of the invention may be vulcanized by methods common to the art, such as open steam, press curing, liquid curing medium ("LCM") and the like, under the normal conditions used for these elastomers. The concentration of the bis(morpholinothiocarbonyl)sulfide will vary depending on the particular range of properties desired in the vulcanizate and also on the particular thiuram sulfide or metal dithiocarbamate used in conjunction with it. Using tetramethylthiuram disulfide and bis(morpholinothiocarbonyl)disulfide as the accelerator combination, greater than about 0.75 part of tetramethylthiuram disulfide with 1.5 parts of bis(morpholinothiocarbonyl)disulfide will lead to increased bloom. If 2.0 or more parts of the bis(morpholinothiocarbonyl)disulfide are used with 0.75 part tetramethylthiuram disulfide, the rate of cure is retarded and the state of cure will be less desirable; less than 1.5 parts usually leads to increased bloom. When 2.0 parts of the bis(morpholinothiocarbonyl)disulfide are used with 1.0 part tetramethylthiuram disulfide, no bloom occurs, scorch protection is greater, and cure rate greater than the combination of 1.5 parts bis(morpholinothiocarbonyl)disulfide and 0.75 part of tetramethylthiuram disulfide. Thus, it can be seen that the concentration of each component of the accelerator system of the present invention will vary, depending on the factors mentioned above, and also on the particular application intended for the vulcanizate, i.e., tires, wire and cable covering, hose, belts, other mechanical goods, cellular products, etc. A generally effective range of concentration of either component will be from about 0.1 to 5.0 parts per 100 parts of rubber.

Other commonly used compounding ingredients, such as carbon black, mineral fillers, clays, processing oils, soaps, waxes, and the like, may be added to the composition as desired to achieve particular properties. The compositions can be mixed on conventional rubber or plastic processing equipment, molded, extruded, or handled in any of the many ways known to those skilled in the rubber art.

The invention is more fully illustrated by the following examples in which parts are on a weight basis.

EXAMPLE 1

Four EPDM rubber compositions were prepared as shown below.

Base formula:
Nordel 1070–E [1] hydrocarbon rubber _____ 150
SAF carbon black _____ 60
ISAF–H carbon black _____ 20
Zinc oxide _____ 5
Stearic acid _____ 1
Sulfur _____ 2
Mercaptobenzothiazole _____ 1.5

[1] 100 parts EPDM+50 parts naphthenic oil.

| | Compound | | | |
|---|---|---|---|---|
| | A | B | C | D |
| Accelerators: | | | | |
| Bis(morpholinothiocarbonyl)disulfide | | | 1.5 | 1.5 |
| Tetramethylthiuram disulfide | 0.75 | 0.75 | | 0.75 |
| Dipentamethylenethiuram disulfide | | 0.75 | | |
| Mooney scorch at 250° F.: Minutes to 5 point rise, T₅ | 13.7 | 17.3 | 61 | 29 |
| 300% Modulus (p.s.i.), cured 320° F. for— | | | | |
| 15 minutes | 690 | 545 | 220 | 635 |
| 20 minutes | 750 | 600 | 285 | 720 |
| 60 minutes | 1,135 | 900 | 690 | 1,070 |
| Bloom resistance [1] | Fair-good | Fair | Very good | Very good |

[1] This is a subjective test. The rating is assessed after examining three or more vulcanizates containing the cure system under consideration.

The data illustrate that EPDM cured with conventional accelerators (Compounds A and B) is very scorchy. Compound B provides more processing safety, but results in a lower state of cure and greater bloom. Bis(morpholinothiocarbonyl)disulfide is too slow curing to be of any practical use (Compound C) and results in a very low state of cure. The combination of bis(morpholinothiocarbonyl)disulfide and tetramethylthiuram disulfide (Compound D) doubles the processing safety of a conventional cure system (Compound A) and results in a good state of cure and low bloom.

EXAMPLE 2

EPDM rubber compositions were prepared as shown below. Ingredients are in parts by weight.

Base formula:
Nordel 1070–E hydrocarbon rubber _____ 150
SAF carbon black _____ 60
ISAF–H carbon black _____ 20
Zinc oxide _____ 5
Stearic acid _____ 1
Sulfur _____ 2
Mercaptobenzothiazole _____ 1.5
Tetramethylthiuram disulfide _____ 0.75

| | Compound | | | |
|---|---|---|---|---|
| | A | B | C | D |
| Accelerators: | | | | |
| Dipentamethylenethiuram hexasulfide | 0.75 | | | |
| Diisopropylthiuram disulfide | | 1.5 | | |
| Phenylethylthiuram sulfide | | | 1.5 | |
| Bis(2,6-dimethylmorpholino-thiocarbonyl) sulfide | | | | 1.5 |
| Mooney scorch at 250° F.: Minutes to 5 point rise, $T_5$ | 11.7 | 14.2 | 15 | 15.9 |
| 300% Modulus, p.s.i., cured 320° F. for— | | | | |
| 15 minutes | 650 | 670 | 750 | 700 |
| 20 minutes | 890 | 940 | 1,050 | 1,050 |
| 60 minutes | 1,200 | 1,050 | 1,175 | 1,150 |
| Bloom resistance | Fair-good | Very poor | Fair-good | Poor-fair |

The data illustrate that none of the wide range of thiuram sulfides shown in combination with tetramethylthiuram disulfide provides a good cure system for EPDM since they are all too scorchy and the compounds bloom excessively.

EXAMPLE 3

The base formula for this example was made in the same way as in Example 1. Accelerator systems containing bis(morpholinothiocarbonyl)disulfide in combination with other conventional thiuram sulfides were added to the base formula as shown. The accelerators used in experiments are identified as follows:

A—Tetramethylthiuram monosulfide
B—Tetramethylthiuram disulfide
C—Tetraethylthiuram disulfide
D—Tetrabutylthiuram disulfide
E—Dipentamethylenethiuram hexasulfide
F—Zinc dimethyldithiocarbamate
G—Zinc dibutyldithiocarbamate
H—Zinc dibenzyldithiocarbamate
I—Diphenyldimethylthiuram disulfide
J—Iron dibenzyldithiocarbamate
K—Bis(morpholinothiocarbonyl)disulfide The good vulcanizate properties, processing safety and excellent resistance to bloom are evident. In the case of the zinc dimethyldithiocarbamate, the scorch time of 14.5 minutes, while faster than the others in the series, is considerably greater than the scorch of the same compound in which the bis(morpholinothiocarbonyl)disulfide is replaced with another thiuram such as tetramethylthiuram disulfide.

EXAMPLE 4

The following base formula was prepared:

Enjay Butyl 218 rubber _____ 100
FEF carbon black _____ 60
CIRCOSOL 2–XH naphthenic oil _____ 40
Zinc oxide _____ 5
Stearic acid _____ 1
Sulfur _____ 1.5
Mercaptobenzothiazole _____ 0.5
Elastopar [1] _____ 0.5

[1] 33% N-methyl-N,4-dinitroso aniline: 67% inert material Monsanto.

Using the above base formula, the following compositions were prapared and tested:

| | A | B | C | D | E | F | G |
|---|---|---|---|---|---|---|---|
| Component: | | | | | | | |
| Tetramethylthiuram disulfide | 1.0 | 1.0 | 1.0 | 1.0 | 1.0 | | |
| Dipentamethylene thiuram hexasulfide | | 1.0 | | 2.0 | | 2.0 | |
| Bis(morpholinothiocarbonyl)-disulfide | | | 1.0 | | 2.0 | 2.0 | 2.0 |
| Mooney scorch at 270° C.: Minutes to 5 point rise, $T_5$ | 17.9 | 16.7 | 23.6 | 17.6 | 33.6 | 13.9 | 64.0 |
| 300% modulus (p.s.i.), cured at 350° F. for— | | | | | | | |
| 12.5 minutes | 385 | 445 | 460 | 485 | 385 | 345 | |
| 25 minutes | 500 | 550 | 590 | 620 | 565 | 515 | |
| 50 minutes | 545 | 615 | 675 | 695 | 565 | 560 | 330 |
| 75 minutes | 545 | 610 | 625 | 660 | 575 | 580 | 380 |
| Bloom Resistance | Fair-Poor | Fair | Good | Excel. | V.G.-Excel. | Excel. | Excel. (none) |

[1] 33% N-methyl-N,4-dinitroso aniline: 67% inert material (Monsanto).

This example shows the effect of using separately either one or the other component parts of the accelerator of this invention. It also shows the effect of using a two-component accelerator which does not have as one of its components, bis(morpholinothiocarbonyl) disulfide.

Preparation of the bis(morpholinothiocarbonyl) sulfides

As indicated by Formula I above, the bis(morpholinothiocarbonyl) sulfide ingredient may exist as the mono- through hexasulfide. However, as will be obvious to those skilled in the art, the products often exist as mixtures of the various sulfides and it should be understood that the invention embraces such mixtures as well as essentially pure compounds.

| | A | B | C | D | E | F | G | H | I | J | K |
|---|---|---|---|---|---|---|---|---|---|---|---|
| Accelerator: | | | | | | | | | | | |
| A | 0.75 | | | | | | | | | | |
| B | | 0.75 | | | 0.75 | | | | | | |
| C | | | 0.75 | | | | | | | | |
| D | | | | 0.75 | | | | | | | |
| E | | | | | | 0.75 | | | | | |
| F | | | | | | | 0.75 | | | | |
| G | | | | | | | | 0.75 | | | |
| H | | | | | | | | | 0.75 | | |
| I | | | | | | | | | | 0.75 | |
| J | | | | | | | | | | | 0.75 |
| K | 1.5 | 1.5 | 1.5 | 1.5 | 1.5 | 1.5 | 1.5 | 1.5 | 1.5 | 1.5 | 1.5 |
| Mooney scorch at 250° F.: Minutes to 5 point rise, $T_5$ | 28.5 | 29.0 | 32.0 | 32.0 | [1] 23.5 | [1] 63.0 | [1] 14.5 | [1] 38.0 | [1] 32.0 | [1] 53.5 | [1] 33.5 |
| 300% modulus: Cured at 320° F. after— | | | | | | | | | | | |
| 15 minutes | 605 | 635 | 555 | 465 | 540 | 245 | 490 | 360 | 400 | 375 | 375 |
| 20 minutes | 815 | 720 | 695 | 670 | 575 | 320 | 520 | 465 | 510 | 470 | 465 |
| 60 minutes | 1,060 | 1,070 | 1,000 | 1,000 | 950 | 800 | 925 | 815 | 920 | 880 | 900 |
| Bloom resistance | Very good | Very good | Very good | Very good | Excellent | Very good | Very good | Excellent | Excellent | Excellent | Excellent |

[1] These compositions were remilled; modulus and scorch data are poorer because of this. Compare Cpds. B and E as a basis for transposition.

Example 3 illustrates the effective combination of bis(morpholinothiocarbonyl)disulfide with a wide variety of thiurams and dithiocarbamic acid salts of various metals.

The following describes preparation of a product predominating in the tetrasulfide. The higher sulfides can readily be formed by varying the reaction conditions, for example, by dissolving elemental sulfur in the sulfur chloride reactant.

In a 5-liter flask a solution of morpholinocarbodithioic acid, sodium acid (anhydrous, 597 grams) in dimethylformamide (anhydrous, 1500 milliliters) was cooled to −5° C. to 0° C. Maintaining temperature at 0° C., sulfur chloride (125 milliliters) was added dropwise with stirring. When addition was complete, the slurry was stirred for 1 hour at 0° C., then to room temperature and filtered. The cake was slurried in water, filtered and water washed. The resulting cake was vacuum-dried at room temperature. A yield of 565 grams of material was obtained. The product was purified by washing with ether then with benzene. A yield of 496 grams dried product was obtained, melting point 121°–123° C. (79.6% theory), further identified as bis(morpholinothiocarbonyl) tetrasulfide.

I claim:
1. A vulcanizable composition comprising zinc oxide, a sulfur vulcanizable elastomer selected from the group consisting of diene-modified ethylene-propylene rubber, butyl rubber containing minor amounts of unsaturation and mixtures consisting essentially of said ethylene-propylene rubber or said butyl rubber with other sulfur vulcanizable elastomers, and an effective activating amount of an improved vulcanization accelerator composition comprising a combination of
   (a) a bis(morpholinothiocarbonyl)sulfide, represented by the formula

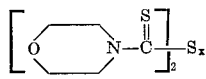

wherein $x$ is an integer of 1 through 6, and
   (b) another compound selected from the group consisting of a thiuramsulfide and a metal dithiocarbamate.
2. The composition of claim 1 also comprising elemental sulfur.
3. The composition of claim 1 wherein the sulfur-vulcanizable elastomer is said diene-modified ethylene-propylene rubber.
4. The composition of claim 1 wherein the sulfur-vulcanizable elastomer is said butyl rubber.
5. The composition of claim 1 wherein the vulcanization accelerator is tetramethylthiuram disulfide and bis(morpholinothiocarbonyl)disulfide.
6. The composition of claim 1 wherein the vulcanization accelerator is tetramethylthiuram monosulfide and bis(morpholinothiocarbonyl) disulfide.

7. The process of vulcanizing a sulfur-vulcanizable elastomer selected from the group consisting of diene-modified ethylene-propylene rubber, butyl rubber containing minor amounts of unsaturation, and mixtures consisting essentially of said ethylene-propylene rubber or said butyl rubber with other sulfur-vulcanizable elastomers, which comprises forming a mixture of said elastomer with zinc oxides and an effective activating amount of vulcanization accelerator composition comprising a combination of (a) bis(morpholinothiocarbonyl)sulfide, represented by the formula:

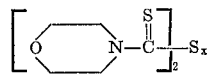

wherein $x$ is an integer of 1 through 6, and (b) at least one other compound selected from the group consisting of a thiuram sulfide and a metal dithiocarbamate; subjecting the mixture to moderately elevated temperatures and continuing to maintain the mixture at the elevated temperature for sufficient time to accomplish the vulcanization, wherein the amount of zinc oxide is at least 1.0 part per 100 parts of elastomer and the amounts of (a) and (b) each are from about 0.1 to 5.0 parts per 100 parts of elastomer.
8. The process of claim 7 wherein said mixture is also formed with elemental sulfur.
9. The process of claim 7 wherein the vulcanization accelerator is tetramethylthiuram disulfide and bis(morpholinothiocarbonyl) disulfide.

References Cited
UNITED STATES PATENTS

| 2,974,117 | 3/1961 | Dunkel et al. | 260—41.5 |
| 3,400,106 | 9/1968 | Morita | 260—79.5 |

FOREIGN PATENTS

| 699,093 | 12/1964 | Canada. |

OTHER REFERENCES

Hofmann, W.: Vulcanization, Palmerton, N.Y., 1965, p. 112–113.

JOSEPH L. SCHOFER, Primary Examiner

C. A. HENDERSON, Jr., Assistant Examiner

U.S. Cl. X.R.

260—41.5, 781, 785, 792, 793